(12) United States Patent
Beeck et al.

(10) Patent No.: US 6,422,811 B1
(45) Date of Patent: Jul. 23, 2002

(54) COOLING ARRANGEMENT FOR BLADES OF A GAS TURBINE

(75) Inventors: Alexander Beeck, Küssaberg; Bernhard Weigand, Filderstadt-Sielmingen, both of (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/593,162

(22) Filed: Jun. 14, 2000

(30) Foreign Application Priority Data

Jun. 14, 1999 (DE) .......................................... 199 26 949

(51) Int. Cl.[7] .............................................. F04D 29/38
(52) U.S. Cl. .................................................... 415/115
(58) Field of Search .................................. 415/115, 116

(56) References Cited

U.S. PATENT DOCUMENTS 4,126,405 A * 11/1978 Bobo et al. .................. 415/115

FOREIGN PATENT DOCUMENTS

| DE | 4336143 C2 | 5/1995 |
|---|---|---|
| DE | 19860787 A1 | 7/2000 |
| EP | 0674009 A2 | 9/1995 |
| EP | 0674099 A1 | 9/1995 |
| JP | 09264103 A | 10/1997 |
| WO | WO97/08431 | 3/1997 |

* cited by examiner

*Primary Examiner*—John Kwon
(74) *Attorney, Agent, or Firm*—Burns, Doane, Swecker & Mathis, L.L.P.

(57) ABSTRACT

A cooling arrangement for blades of a gas turbine or the like, in each case the blades being built up from a suction-side wall and a pressure-side wall which are connected, to form a cavity, via a leading edge, a trailing edge, a blade tip and a blade root, and a flow path, through which a cooling medium, in particular steam, is capable of flowing, being integrated in the cavity, and in which the flow paths in each case of two or more adjacent blades are connected to one another in such a way that a continuous cooling duct sealed off relative to the hot-gas stream is formed. It thus becomes possible to increase cooling efficiency by better utilization of the cooling medium and at the same time to reduce the outlay in terms of construction.

15 Claims, 4 Drawing Sheets

COOLING ARRANGEMENT FOR BLADES OF A GAS TURBINE

FIELD OF THE INVENTION

The present invention relates to a cooling arrangement for blades of a gas turbine or the like.

BACKGROUND OF THE INVENTION

It is generally known for blades of a gas turbine which are subjected to high thermal loading to be provided with a cooling arrangement. In the thermal combined-cycle power plants primarily relevant here, in order to cool the components subjected to thermal loading air is often extracted from the process gas stream, with the result that the overall efficiency of the plant is sometimes seriously impaired.

According to EP 0 674 009 A1, therefore, it was proposed, for cooling purposes, to draw saturated steam from a waste-heat steam generator or superheated steam from the steam circuit and supply it to the components to be cooled. The steam is subsequently led back into a steam turbine of the steam circuit at a suitable point. A principle advantage of this concept is that an improvement in the cooling action can be achieved on the account of the specific heat capacity of steam, so that a design based on a higher hot-gas temperature is possible. Furthermore, insofar as cooling is carried out in a closed circuit, improved efficiency of the combined-cycle plant is obtained.

In this respect, the configuration of the cooling ducts of the blades to be cooled assumes particular importance, since these are critical for the utilization of the cooling potential of the steam and the equalization of the component temperature. DE 19860787.3, from which the invention proceeds, discloses an optimized cooling arrangement for blades of a gas turbine, the blades being built up in each case from a suction-side and a pressure-side wall which are connected to one another, to form a cavity, via a leading edge, a trailing edge, a blade tip and a blade root. Integrated in the cavity is a flow path in the form of a multiplicity of cooling ducts, through which a cooling medium, in particular steam, is capable of flowing. Each blade of a corresponding blade row possesses a supply duct, via which the steam is fed in, and an outflow duct, via which the steam leaves the respective blade again.

Although cooling arrangements of this type have proved most appropriate, in many cases they cannot yet be considered optimal from the point of view of the utilization of the cooling potential of the steam led through them. The outlay in terms of construction is also considerable, since both a supply duct and an outflow duct for the steam must be assigned to each blade. Finally, appreciable flow losses occur when the steam is led by the blade, since the deflection of the steam in the region of the blade root has to take place in an extremely restricted space.

BRIEF SUMMARY OF THE INVENTION

The invention attempts to avoid the disadvantages described. The object on which it is based is to specify a cooling arrangement for blades of a gas turbine of the type initially mentioned, which allows an improved utilization of the cooling potential of the steam led through and, furthermore, makes a simplified construction possible.

This is achieved, according to the invention, in that in each case two or more adjacent blades are combined and the flow paths are configured as a continuous cooling duct sealed off relative to the hot-gas stream. A greater quantity of heat can thereby be supplied to the steam flowing through, thus increasing the efficiency of the steam cycle. Moreover, the number of connections required is reduced, since only one supply duct and one outflow duct have to be provided for each blade group. The number of connections required is halved simply by two blades being connected to form a twin blade. When multiple blades are concerned, this effect can be increased even further, since the blades in each case located on the inside do not need connections of this type.

Expediently, the cooling medium is first supplied to a distributor space and is introduced from there into the cooling ducts of the blades assigned to this distributor space. A corresponding collecting space, out of which the heated steam is discharged, is provided on the outflow side.

The distributor space and collecting space may be built up particularly cost-effectively from tubes in the form of segments of an arc of a circle. These tubes make it possible to have in each case a congruent design of the distributor space and collecting space, these being mounted mirror-symmetrically to one another. The diversity of components can be considerably reduced in this way.

Preferably, the distributor space and the collecting space are mounted in a casing portion. An extremely space-saving and axially short-sized turbine stage can be produced as a result.

Corresponding to this, a deflecting space may be integrated as a crossover from one blade to the adjacent blade in the region of a platform portion, cooling of the blade root region and hub region thereby additionally taking place.

A further variant also tends in this direction, in which the steam at the outlet of the respective blade is used even further for cooling a heat accumulation segment which surrounds an adjacent moving blade row. In this case, the cooling duct is thus prolonged beyond the region of the blade row primarily to be cooled and consequently allows the efficient cooling of a complete turbine stage.

Depending on the construction of the blade to be cooled, the cooling duct may be built up from a plurality of part ducts running essentially parallel. This measure allows optimum distribution of the steam and directional adjustment to those regions of the wall which are subjected to particularly high thermal stress.

A variant provides for individual part ducts or groups of part ducts to be arranged separately from one another in a fluidtight manner. This design ensures that there is no intermixing of the individual part cooling streams. This effect may advantageously be utilized, for example, either to supply different cooling media, or to use cooling media having different state variables directionally to specific regions of the blade, in order thereby to effect optimum adjustment to temperature distributions imparted from outside.

A series of further preferred embodiments is also to be seen from this aspect, intended, in particular, for compensating radial temperature gradients and, furthermore, allowing for the fact that heating takes place when the steam passes through the flow duct, with the result that the temperature difference, available for heat transmission, between the steam and the blade wall changes.

In order to set a constant heat discharge or heat transmission condition, on the one hand, there may be provision for the cooling duct to have a cross-sectional profile decreasing in the direction of flow of the cooling medium. For most applications relevant in practice, it is not necessary to implement an idealized continuous cross-sectional reduction. It is often sufficient, instead, to integrate a geometrically simply constructed displacement body in the flow path at a suitable point. A particularly simple construction is obtained when the displacement body is arranged continuously between the blade root and blade tip of a blade. In the case of a twin blade, for example, the first blade is provided with a cavity running rectilinearly, whereas the second blade, whilst having an identical cavity contour, is provided with a displacement body inserted into the cavity. The displacement body may have a variable cross section, for example a cross-sectional profile increasing in the direction of flow, so that the residual cross section remaining in the cavity is largely approximated to the ideal calculated cross-sectional profile.

Alternatively, it is also possible to leave the cross section unchanged in the direction of flow and, instead, provide turbulence-generating elements, for example in the form of baffle plates or webs. Furthermore, the area of these elements may increase in the direction of flow, thus taking into account the increase in the coolant temperature by an increase in the coefficient of heat transmission. Mounting is recommended, in particular, in portions where there is high thermal loading, that is to say, in particular, in the region of the leading edge.

BRIEF DESCRIPTION OF THE DRAWINGS

Exemplary embodiments of the invention are reproduced by means of diagrammatic illustrations in the drawing in which.

DETAILED DESCRIPTION OF THE INVENTION

Figure 1:
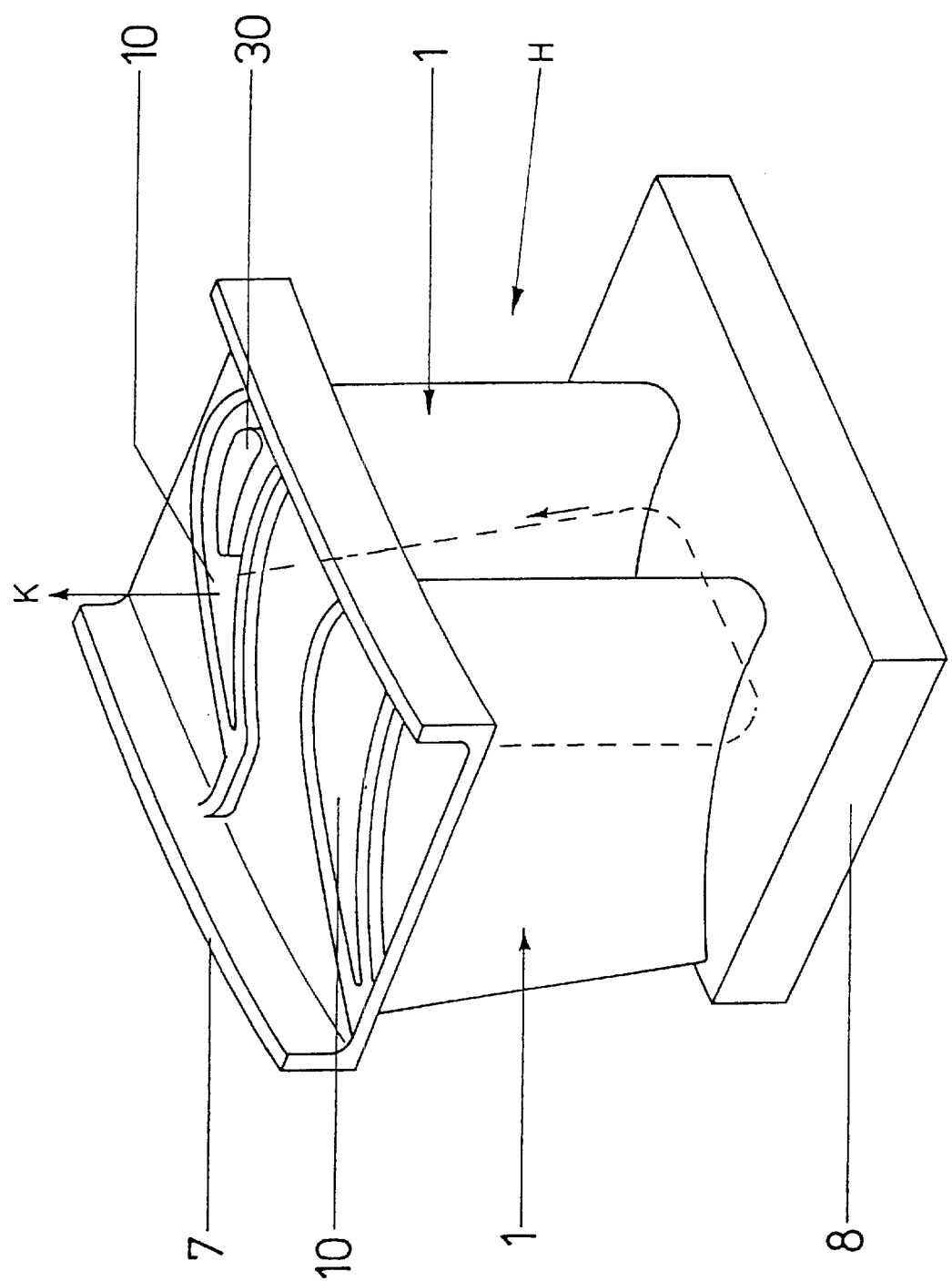
FIG. 1 shows a perspective view of a twin blade.
Figure 2:
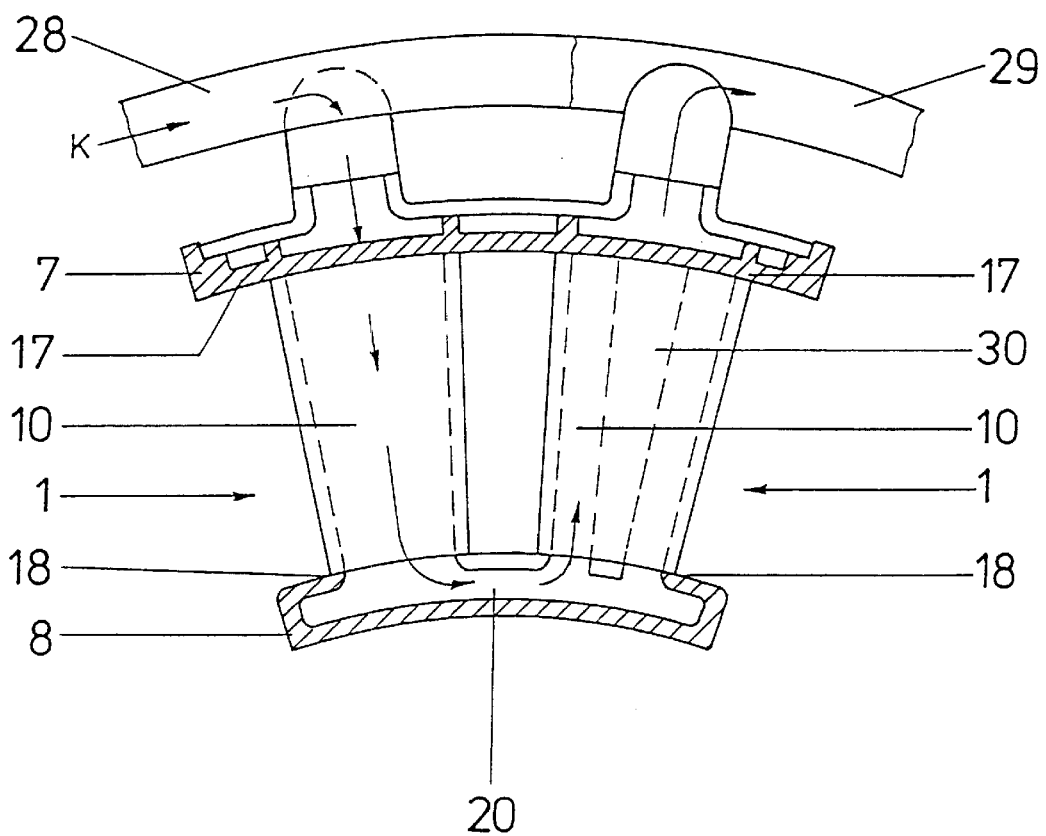
FIG. 2 shows an axial section of the twin blade according to FIG. 1.
Figure 3:
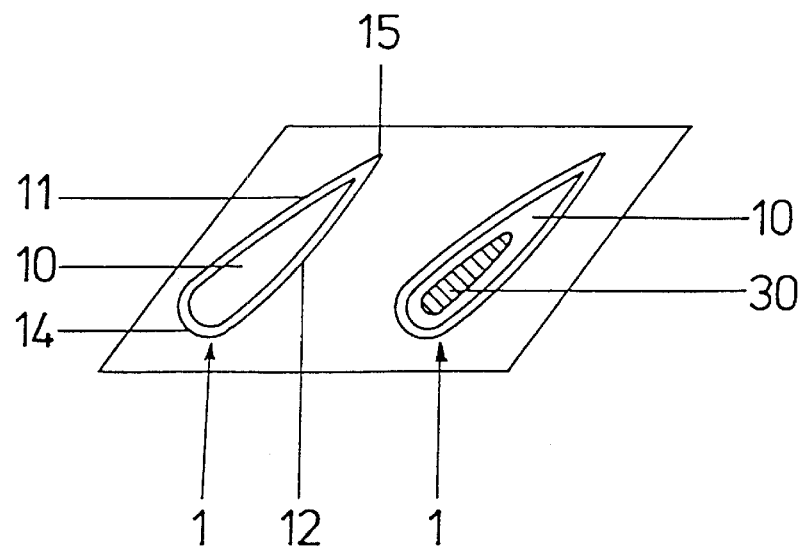
FIG. 3 shows a radial section of the twin blade according to FIG. 1.

FIGS. 1 to 3 illustrate the twin arrangement of two blades 1. The two blades 1 are held in the radial direction between a casing portion 7 and a platform portion 8.

Each of the blades 1 consist of a suction-side wall 11 and of a pressure-side wall 12 which are connected to one another, to form a cavity, via a leading edge 14 and a trailing edge 15. The suction-side wall 11 and the pressure-side wall 12 merge, in the region of a blade tip 17, into the casing portion 7 and, in the region of blade root 18, into the platform portion 8.

Inside the blade, a cavity 10 is thus formed, through which a cooling medium K, in particular steam, is capable of flowing in the way described in more detail below. The flow path 10 is sealed off relative to a hot-gas stream H, so that no intermixing of the cooling medium K with hot gas H can take place.

Starting from the flow path 10 of the blade 1 illustrated on the left in FIGS. 1 to 3, a cooling duct is formed, which, in the region of a deflecting space 20 integrated in the platform portion 8, merges into the flow path 10 of the blade 1 illustrated on the right.

Inserted in the flow path 10 of the right blade 11 is a displacement body 30 which passes continuously through the blade 1 in the radial direction between the platform portion 8 and the casing portion 7. The cooling duct formed in this way thus possesses at the inlet of the left blade, that is to say in the region of its blade tip 17, a maximum cross section which, by virtue of the blade geometry, first decreases continuously in the direction of flow of the cooling medium K as far as the plane of the blade root 18. Further along, specifically in the plane of the blade root 18 of the right blade 1, the cross section is further reduced by the displacement body 30, until said cross section finally reaches it minimum value and departure from the blade 1 in the region of the blade tip 17.

The cross-sectional reduction progressing with the direction of flow of the cooling medium K is dimensioned in such a way that the increasing heating of the cooling medium K and the decreasing temperature difference consequently available for heat transmission are compensated.

Figure 4:
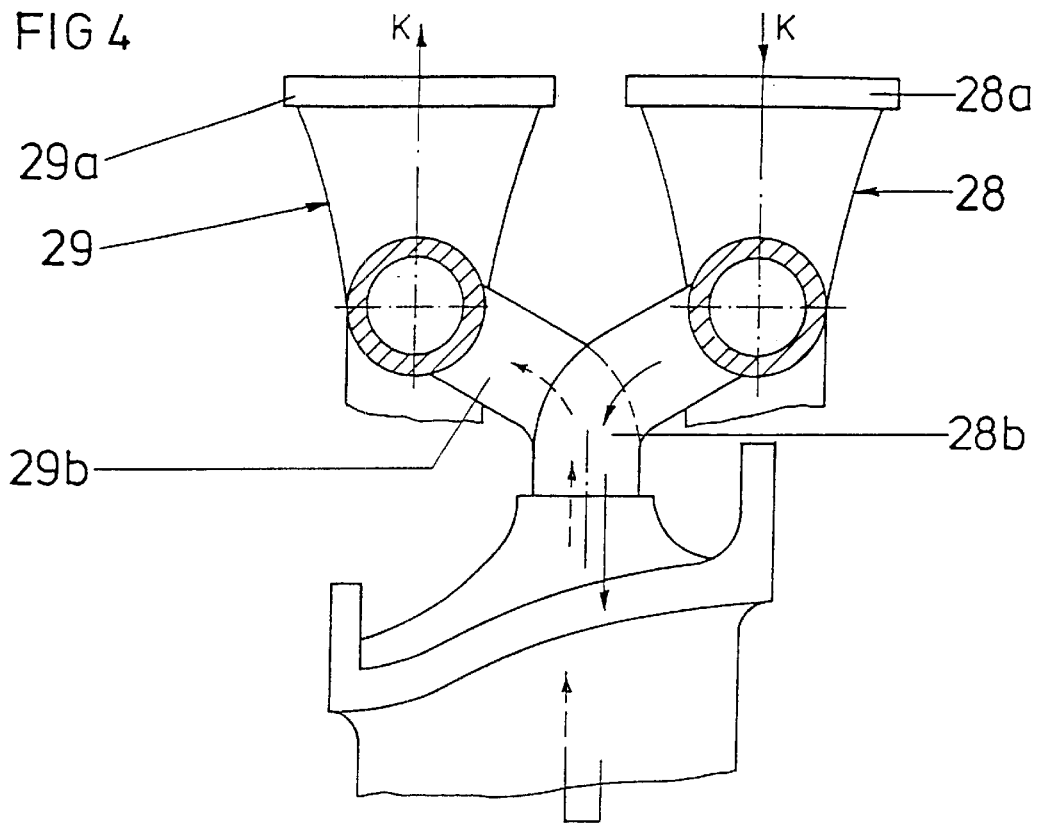
FIG. 4 shows a part view of the distributor space and collecting space.
Figure 5:
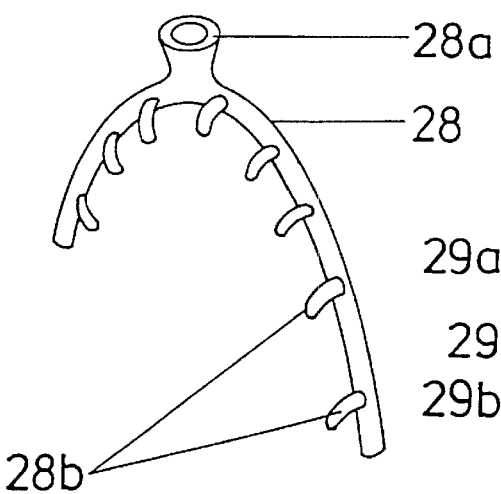
FIG. 5 shows a perspective view of the distributor space.
Figure 6:
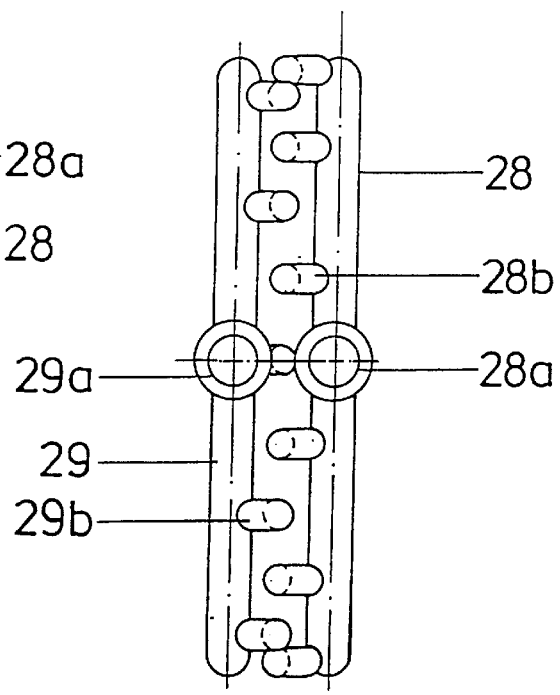
FIG. 6 shows a top view of the distributor space and collecting space.

The cooling medium K is supplied and discharged via a distributor space 28 and a collecting space 29, as are illustrated, in particular, in FIGS. 4 to 6. The distributor space 28 and the collecting space 29 are designed as congruent tubes in the form of segments of an arc of a circle. Expediently, division takes place in semiarcs, in order to make it possible to have the horizontal casing division which is often to be encountered in stationary gas turbines.

The cooling medium K is supplied via a connection piece 28a arranged centrally on the distributor space or tube 28 and leaves the collecting space or the tube 29 via a corresponding connection piece 28a, likewise arranged centrally. Between the tube 28 and the respective inflow-side blades are provided junction pieces 28b, and, corresponding to these, junction pieces 29b are fastened to the tube 29 on the outflow side.

As is apparent particularly from FIG. 6, the mirror-symmetric arrangement of the two tubes 28, 29 makes it possible in this case to attach every second blade to the distributor space 28 or the collecting space 29.

Figure 7:
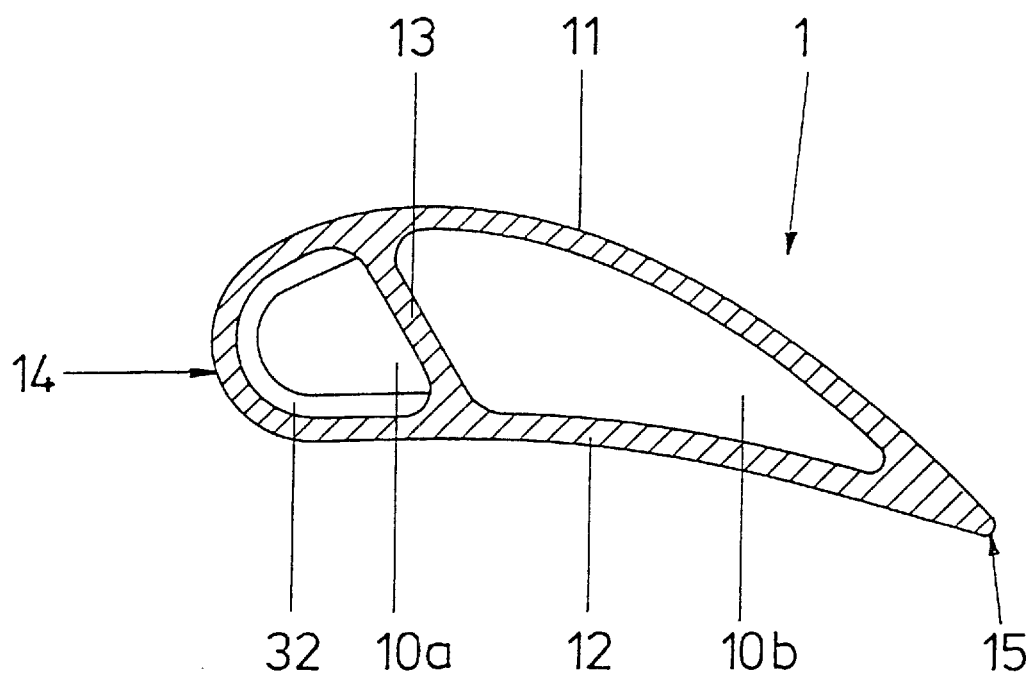
FIG. 7 shows a radial section of the blade according to a design variant.

FIG. 7 illustrates a blade 1, in which the cavity between the suction-side wall 11 and the pressure-side wall 12 is divided by a partition 13 into a part duct 10a and 10b. The separation between the part ducts 10a, 10b is designed to be fluidtight, so that, for example, there is the possibility of using steam of different pressure. Thus, superheated steam at higher pressure may be used to cool that region of the blade 1 which is subjected to higher thermal loading, in the region of the leading edge 14, whilst steam at low pressure is provided for cooling the region subjected to lower loading, in the region of the trailing edge 15.

Baffle plates 32 serving as turbulence generators are used to increase cooling efficiency even further.

It goes without saying that the size and/or the density of arrangement of the baffle plates 32 may increase, as seen in the direction of flow of the cooling medium K, in order to allow for the temperature increase caused by the introduction of heat. It is also possible, instead of baffle plates 32 used subsequently, to provide webs which are integrally formed directly, for example during the casting operation, when the blade 1 is being produced. Furthermore, where cast blades are concerned, it is appropriate for the cross-sectional profile of the cooling ducts 10, 10a, 10b to be contoured even at the time of shaping, in such a way that additional measures for cross-sectional narrowing, such as the displacement bodies 27 described above, may be dispensed with.

Finally, there is also the possibility of applying different cooling media to the cooling ducts 10, 10a, 10b successively in time. Thus, in the case of a gas turbine of a combined-cycle power station, usually steam is not yet available during the start-up. It is therefore appropriate first to branch off air from the compressor and use it for cooling the blades. As soon as the start-up operation is concluded and steam is available, the latter is fed in instead of the compressor air. The changeover takes place by means of valve control in a way known per se.

What is claimed is:

1. A cooling arrangement for blades of a gas turbine, each blade being built up from a suction-side wall and a pressure-side wall which are connected, to form a cavity, by a leading edge, a trailing edge, a blade tip and a blade root, and a flow path, through which a cooling medium is capable of flowing, being integrated in the cavity, the flow paths of two or more adjacent blades are connected to one another such that a continuous cooling duct sealed off relative to the hot-gas stream is formed.

2. A cooling arrangement for blades of a gas turbine, the blades being build up from a suction-side wall and a pressure-side wall which are connected to form a cavity by a leading edge, a trailing edge, a blade tip and a blade root, and a flow path, through which cooling medium is capable of flowing, the flow paths of two or more adjacent blades are connected to one another such that a continuous cooling duct is sealed off relative to the hot-gas stream, at least one distributor space, which is connected to the cooling duct of a first group of blades, and at least one collecting space, which is connected to the cooling ducts of a second group of blades.

3. The cooling arrangement as claimed in claim 2, wherein the distributor space and the collecting space are built up from tubes which are in the form of segments of an arc of a circle and which are in each case designed congruently and are arranged mirror-symmetrically to one another.

4. The cooling arrangement as claimed in claim 2, wherein the distributor space and the collecting space are mounted in a casing portion.

5. The cooling arrangement as claimed in claim 2, defined by a deflecting space, which is preferably integrated in a platform portion.

6. The cooling arrangement as claimed in claim 2, wherein the cooling duct or the collecting space opens out in the region of a heat accumulation segment of an axially adjacent moving blade row.

7. The cooling arrangement as claimed in claim 1, wherein the cooling duct is built up from a plurality of part ducts running essentially parallel.

8. The cooling arrangement as claimed in claim 7, wherein the part ducts or groups of part ducts are arranged separately from one another in a fluid tight manner.

9. The cooling arrangement as claimed in claim 8, wherein the different cooling media or cooling media having different state variables are capable of being applied to the part ducts or groups of part ducts.

10. The cooling arrangement as claimed in claim 1, wherein the cooling duct has a cross-sectional profile decreasing in the direction of flow of a cooling medium.

11. The cooling arrangement as claimed in claim 10, defined by at least one displacement body integrated in the flow path.

12. The cooling arrangement as claimed in claim 11, wherein the displacement body is arranged continuously between the blade root and the blade tip.

13. The cooling arrangement as claimed in claim 1, defined by turbulence-generating elements, which are provided in the flow path in portions of particularly high thermal loading.

14. The cooling arrangement as claimed in claim 13, wherein the turbulence-generating elements comprise baffles, plates or webs.

15. The cooling arrangement as claimed in claim 13, wherein the portions of particularly high thermal loading is in a region of the leading edge.

* * * * *